US010050693B2

(12) United States Patent
Bejarano et al.

(10) Patent No.: US 10,050,693 B2
(45) Date of Patent: Aug. 14, 2018

(54) METHOD AND SYSTEM FOR REDUCING SOUNDING OVERHEAD IN WIRELESS COMMUNICATION

(71) Applicant: William Marsh Rice University, Houston, TX (US)

(72) Inventors: Oscar Bejarano, Cleveland, OH (US); Sadia Quadri, Sugarland, TX (US); Edward W. Knightly, Houston, TX (US); Omer Gurewitz, Beer Sheva (IL); Eugenio Magistretti, Cambridge, MA (US)

(73) Assignee: William Marsh Rice University, Houston, TX (US)

( * ) Notice: Subject to any disclaimer, the term of this patent is extended or adjusted under 35 U.S.C. 154(b) by 62 days.

(21) Appl. No.: 15/199,148

(22) Filed: Jun. 30, 2016

(65) Prior Publication Data

US 2017/0005713 A1 Jan. 5, 2017

Related U.S. Application Data

(60) Provisional application No. 62/187,055, filed on Jun. 30, 2015.

(51) Int. Cl.
*H04W 72/04* (2009.01)
*H04B 7/06* (2006.01)
(Continued)

(52) U.S. Cl.
CPC ......... *H04B 7/0626* (2013.01); *H04L 5/0048* (2013.01); *H04W 48/20* (2013.01);
(Continued)

(58) Field of Classification Search
CPC .... H04B 7/0626; H04W 48/20; H04W 24/08; H04W 16/28; H04W 84/12; H04L 5/0048
See application file for complete search history.

(56) References Cited

U.S. PATENT DOCUMENTS 9,078,153 B1 * 7/2015 Schelstraete .......... H04W 88/08
9,100,154 B1 * 8/2015 Jeffery ..................... H04L 5/005
(Continued)

OTHER PUBLICATIONS

H. Viswanathan, S. Venkatesan, and H. Huang; "Downlink capacity evaluation of cellular networks with known-interference cancellation"; IEEE SAIC, 21(5):802-811, Jun. 2003; 10 pages.
(Continued)

*Primary Examiner* — Jay P Patel
(74) *Attorney, Agent, or Firm* — Osha Liang LLP (57) ABSTRACT

A method for transmitting packets. The method includes making a first determination, using a first relevant sample set for a first client device, that the first client device does not need to be sounded and making a second determination, using a second relevant sample set for the second client device, that a second client device needs to be sounded. The method further includes, based on the first and second determination, performing a sounding operation for the second client device to obtain channel state information for the second client device and after performing the sounding operation for the second client device: wirelessly transmitting at least one packet to the first client device using historical channel state information for the first client device, and wirelessly transmitting at least one packet to the second client device using the channel state information.

18 Claims, 5 Drawing Sheets

(51) Int. Cl.
*H04L 5/00* (2006.01)
*H04W 48/20* (2009.01)
*H04W 84/12* (2009.01)
*H04W 16/28* (2009.01)
*H04W 24/08* (2009.01)

(52) U.S. Cl.
CPC ............ *H04W 16/28* (2013.01); *H04W 24/08* (2013.01); *H04W 84/12* (2013.01)

(56) References Cited

U.S. PATENT DOCUMENTS

| | | | | |
|---|---|---|---|---|
| 9,490,882 | B1* | 11/2016 | Schelstraete | H04B 7/0452 |
| 9,698,878 | B2* | 7/2017 | Schelstraete | H04B 7/0417 |
| 9,807,635 | B2* | 10/2017 | Schelstraete | H04W 24/10 |
| 2007/0153731 | A1* | 7/2007 | Fine | H04L 25/0204 370/329 |
| 2011/0075607 | A1* | 3/2011 | Kim | H04B 7/0417 370/328 |
| 2012/0207036 | A1* | 8/2012 | Ong | H04W 74/0816 370/252 |
| 2014/0160947 | A1* | 6/2014 | Du | H04B 7/0452 370/252 |
| 2014/0219111 | A1* | 8/2014 | Du | H04W 24/02 370/252 |
| 2014/0294108 | A1* | 10/2014 | Etkin | H04B 7/066 375/267 |
| 2015/0078470 | A1* | 3/2015 | Etkin | H04L 25/0206 375/267 |
| 2015/0270879 | A1* | 9/2015 | Chen | H04L 5/0023 375/267 |
| 2015/0270880 | A1* | 9/2015 | Harel | H04L 5/0073 370/338 |
| 2016/0127019 | A1* | 5/2016 | Schelstraete | H04B 7/0626 370/252 |
| 2016/0255656 | A1* | 9/2016 | Lou | H04L 1/0026 370/335 |
| 2016/0316424 | A1* | 10/2016 | Jia | H04L 1/1607 |

OTHER PUBLICATIONS

Cisco Public Information; "802.11ac: The Fifth Generation of Wi-Fi"; Cisco Technical White Paper; Mar. 2014; 25 pages.

IEEE Computer Society; "Part 11: Wireless Lan Medium Access Control (MAC) and Physical Layer (PHY) Specifications; Amendment 4: Enhancements for Very High Throughput for Operation in Bands below 6 GHz"; IEEE Standard Association; IEEE Std 802.11ac-2013; 2013, 425 pages.

Aryafar, Ehsan et al.; "Design and Experimental Evaluation of Multi-User Beamforming in Wireless LANS"; MobiCom 10, Sep. 20-24, 2010, Chicago, Illinois; 12 pages.

Balan, Horia Vlad et al.; "Achieving High Data Rates in a Distributed MIMO System"; MobiCom '12, Aug. 22-26, 2012, Istanbul, Turkey; 12 pages.

Bejarano, Oscar et al.; "IEEE 802, 11ac: From Channelization to Multi-User MIMO"; IEEE Communications Magazine, Oct. 2013; 7 pages.

Caire, Giuseppe, et al.; "Multiuser MIMO Achievable Rates with Downlink Training and Channel State Feedback"; arXiv:0711. 2642v2 [cs.IT]; May 8, 2009; 31 pages.

Chen, Bo-Si et al.; "Harnessing Receive Diversity in Distributed Multi-User MIMO Networks"; SIGCOMM '13, Aug. 12-16, 2013, Hong Kong, China; 2 pages.

Czink, Nicolai, "Spatial Separation of Multi-User MIMO Channels"; EURO-COST (European Cooperation in the Field of Scientific and Technical Research); COST 2100 TD (08)622; Oct. 6-8, 2008; Lille, France; 6 pages.

Lee, Ian W.C. et al.; "Analysis and modeling of a campus wireless network TCP/IP traffic"; Elsevier B.V., Computer Networks, 2009; 14 pages.

Shen, Wei-Liang, et al.; "Rate Adaptation for 802.11 Muitiuser Mimo Networks"; Proceedings of the 18th Annual International Conference on Mobile Computing and Networking—MOBICOM '12 (2012); MIT Open Access Articles, DSpace@MIT; 12 pages.

Shepard, Clayton et al.; "Argos: Practical Many-Antenna Base Stations"; MobiCom '12, Aug. 22-26, 2012, Istanbul, Turkey; 12 pages.

Yoo, Taesang et al.; "On the Optimality of Multiantenna Broadcast Scheduling Using Zero-Forcing Beamforming"; IEEE Journal on Selected Areas in Communications, vol. 24, No. 3, Mar. 2006; 14 pages.

Tan, Kun et al.; "Fine grained Channel Access in Wireless LAN"; SIGCOMM '10, Aug. 30-Sep. 3, 2010, New Delhi, India; 12 pages.

Tan, Kun et al.; "SAM: Enabling Practical Spatial Multiple Access in Wireless LAN"; MobiCom '09 Sep. 20-25, 2009, Beijing, China; 12 pages.

Xie Xiufeng, Zhang Xinyu, and Sandaresan Karthikeyan; "Adaptive Feedback Compression for MIMO Networks"; MobiCom '13, Sep. 30-Oct. 4, 2013, Miami, FL, USA; 12 pages.

* cited by examiner

METHOD AND SYSTEM FOR REDUCING SOUNDING OVERHEAD IN WIRELESS COMMUNICATION

CROSS-REFERENCE TO RELATED APPLICATIONS

This application claims priority under 35 U.S.C. § 119(e) to U.S. Provisional Patent Application Ser. No. 62/187,055 filed on Jun. 30, 2015. U.S. Provisional Patent Application Ser. No. 62/187,055 is hereby incorporated by reference in its entirety in to the instant application.

STATEMENT REGARDING FEDERALLY SPONSORED RESEARCH OR DEVELOPMENT

The invention was made with government support under Grant Number CNS-1444056 awarded by the National Science Foundation. The invention was made with government support under Grant Number CNS-1126478 awarded by the National Science Foundation. The invention was made with government support under Grant Number CNS-1012831 awarded by the National Science Foundation. The government has certain rights in the invention.

BACKGROUND

Wireless access points (APs) transmit packets to client devices using one or more wireless communication protocols. Some of the wireless protocols employ beamforming techniques in order to improve the communication between the wireless access points and the client devices. In order to implement the beamforming techniques, the wireless access points implement "sounding" as a means to obtain information that can be used as input to the beamforming techniques. "Sounding" introduces overhead which may decrease the efficiency at which the wireless access points are able to transmit packets to the client devices.

SUMMARY

In general, in one aspect, the invention relates to a method for transmitting packets. The method includes selecting an initial set of client devices comprising a first client device and a second client device, making a first determination, using a first relevant sample set for the first client device, that the first client device does not need to be sounded, making a second determination, using a second relevant sample set for the second client device, that the second client device needs to be sounded, based on the first and second determination, performing a sounding operation for the second client device to obtain channel state information for the second client device, after performing the sounding operation for the second client device: wirelessly transmitting at least one packet to the first client device using historical channel state information for the first client device, and wirelessly transmitting at least one packet to the second client device using the channel state information.

In general, in one aspect, the invention relates to an access point that includes a processor, a plurality of antennas, and wherein the access point is programmed to: select an initial set of client devices comprising a first client device and a second client device, make a first determination, using a first relevant sample set for the first client device, that the first client device does not need to be sounded, make a second determination, using a second relevant sample set for the second client device, that the second client device needs to be sounded, based on the first and second determination, perform a sounding operation for the second client device to obtain channel state information for the second client device, after performing the sounding operation for the second client device: wirelessly transmit at least one packet to the first client device using historical channel state information for the first client device, and wirelessly transmit at least one packet to the second client device using the channel state information.

In general, in one aspect, the invention relates to a non-transitory computer readable medium comprising computer readable program code which, when executed by a computer processor, enables the computer processor to: select an initial set of client devices comprising a first client device and a second client device, make a first determination, using a first relevant sample set for the first client device, that the first client device does not need to be sounded, make a second determination, using a second relevant sample set for the second client device, that the second client device needs to be sounded, based on the first and second determination, perform a sounding operation for the second client device to obtain channel state information for the second client device, after performing the sounding operation for the second client device: wirelessly transmit at least one packet to the first client device using historical channel state information for the first client device, and wirelessly transmit at least one packet to the second client device using the channel state information.

DETAILED DESCRIPTION

Specific embodiments of the invention will now be described in detail with reference to the accompanying figures. In the following detailed description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description In the following description of FIGS. 1-5, any component described with regard to a figure, in various embodiments of the invention, may be equivalent to one or more like-named components described with regard to any other figure. For brevity, descriptions of these components will not be repeated with regard to each figure. Thus, each and every embodiment of the components of each figure is incorporated by reference and assumed to be optionally present within every other figure having one or more like-named components. Additionally, in accordance with various embodiments of the invention, any description of the components of a figure is to be interpreted as an optional embodiment which may be implemented in addition to, in conjunction with, or place of the embodiments described with regard to a corresponding like-named component in any other figure.

In general, embodiments of the technology relate to a method and system for improving wireless communication between access points and client devices (also referred to as clients). More specifically, embodiments of the invention utilize selective sounding in order to decrease the overhead associated with wirelessly transmitting packets between the access points and the client devices (see e.g., FIG. 4). Further, embodiments of the invention decouple the sounding from the client device selection process (see e.g., FIG. 3), thereby enabling the access points to use the results of the selective sounding to determine which client devices to service concurrently.

Figure 1:
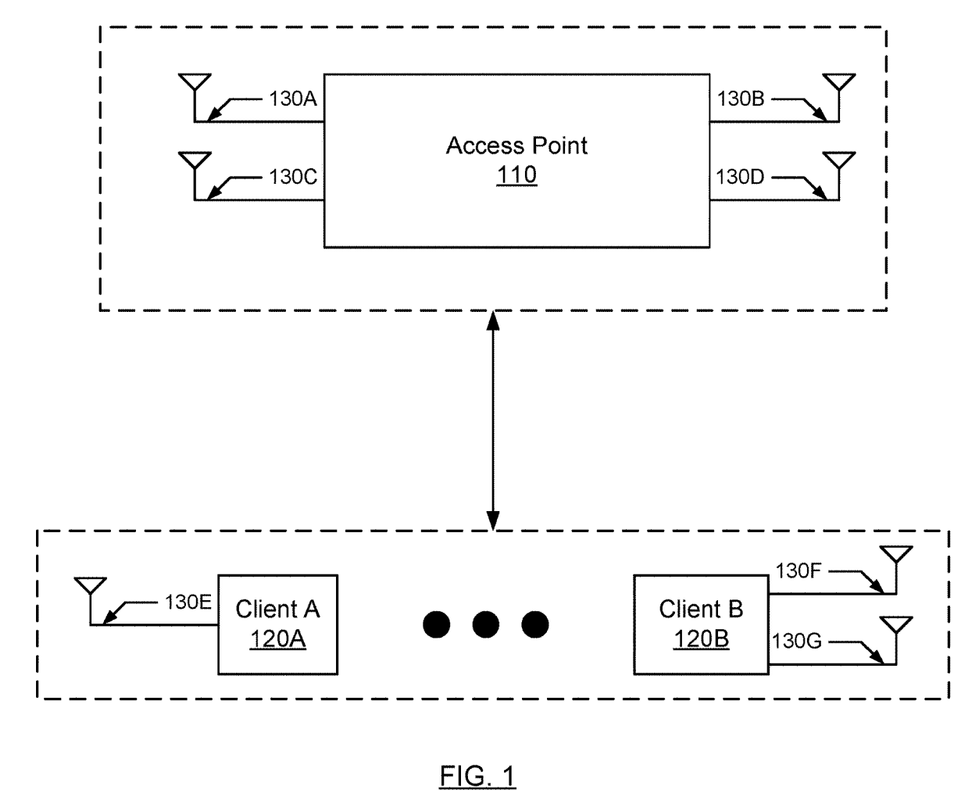
FIG. 1 shows an example system in accordance with one or more embodiments of the invention.

FIG. 1 shows an example system in accordance with one or more embodiments of the invention. The system includes an access point (AP) (100) and a number of client devices (120A, 120B). Each of these components is described below.

In one embodiment of the invention, the access point is a physical device that includes one or more computer processor(s) (not shown), associated memory (not shown) (e.g., random access memory (RAM), cache memory, etc.), one or more storage device(s) (not shown) (e.g., a hard disk, solid-state memory, etc.), and one or more antennas (130A-103D). The computer processor(s) (not shown) may be an integrated circuit for processing instructions. For example, the computer processor(s) may be one or more cores, or micro-cores of a processor.

The AP (110), in one or more embodiments of the invention, includes functionality to send and receive packets in accordance with one or more wireless protocols. Examples of wireless protocols that may be implemented by the AP (110) may include, but are not limited to, IEEE 802.11n and IEEE 802.11ac. Further, the AP (110) is configured to implement all or a portion of the methods described in FIGS. 3 and 4 below. In one embodiment of the invention, software instructions in the form of computer readable program code to perform embodiments of the invention may be stored, in whole or in part, temporarily or permanently, on a non-transitory computer readable medium such as the associated memory of the AP (described above) and/or the storage devices (described above) of the AP (or operatively connected to the AP). Specifically, the software instructions may correspond to computer readable program code, that when executed by a processor(s), is configured to perform embodiments of the invention (e.g., the methods shown in FIGS. 3 and 4).

In one embodiment of the invention, the AP (110) may be connected to an additional network (not shown) via a wired or wireless link. In one or more embodiments of the invention, the additional network is the Internet or a private network. When the AP (110) is connected to the additional network, the client devices (120A, 120B) may communicate with the additional network via the AP (110).

In one embodiment of the invention, the client device (120A, 120B) may correspond to any communication device (see e.g., FIG. 5) that includes functionality to wirelessly communicate with an access point (see e.g., FIG. 1, 110) in accordance with one or more embodiments of the invention. Examples of communication devices may include, but are not limited to, a phone, smart phone, a laptop, a wireless access point, a wireless router, a gaming console, a set top box, a television, a tablet computer, and a desktop computer.

In one embodiment of the invention, each client device (120A, 120B) may include one or more antennas (130E-130F), which may be used to wirelessly receive packets from the AP and/or to wirelessly transmit packets to the AP. Further, each client device (120A, 120B), in one or more embodiments of the invention, includes functionality to send and receive packets in accordance with one or more wireless protocols. Examples of wireless protocols that may be implemented by the client devices may include, but are not limited to, IEEE 802.11n and IEEE 802.11ac.

Figure 2A:
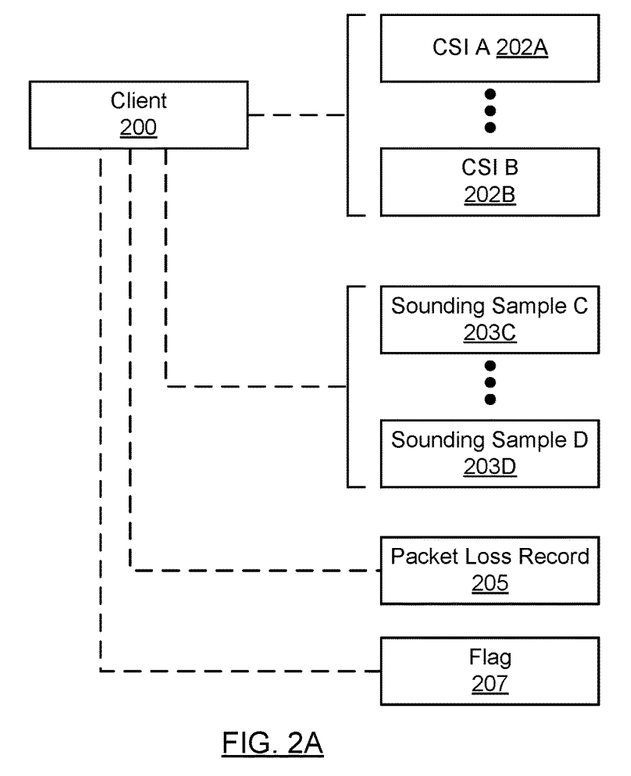
FIGS. 2A and 2B show data structures in accordance with in accordance with one or more embodiments of the invention.
Figure 2B:
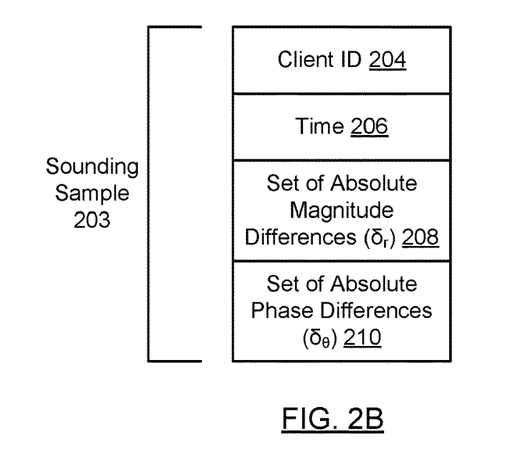

FIGS. 2A and 2B show data structures in accordance with in accordance with one or more embodiments of the invention. More specifically, the AP may collect information about various client devices, where the collected information is used, at least in part, to perform the methods described below in FIGS. 3 and 4. The collected information may be stored using one or more data structures. Further, the collected information may be stored using any known or later discovered data structure(s) without departing from the invention.

Turning to FIG. 2A, for each client device (200), the access point may collect channel state information (CSI) (202A, 202B) and generate one or more sounding samples (203C, 203D). In addition, the access point may also maintain a packet loss record (205) for each client device and a flag (which may or may not be set) for each client device. Each of these components is described below.

In one embodiment of the invention, the channel state information (CSI) (202A, 202B) includes information that is obtained when a sounding operation is performed for a given client device. The sounding operation may correspond to a sounding operation that is specified in IEEE 802.11ac. Sounding operations other than the sounding operation specified in 801.11ac may be performed in order to obtain the CSI without departing from the invention.

In one embodiment of the invention, the CSI may include, but is not limited to,: (i) a time stamp (t) (which indicates when the CSI was obtained) and (ii) for each transmit/receive antenna pair, the magnitude ($\theta$) and phase (r) of the signal received by the receiving antenna. In one embodiment of the invention, the transmit/receive antenna pair corresponds to the transmission antenna used on the AP and the receiving antenna on the client device. For example, if there are four antennas on the AP and one antenna on the client device, then CSI would include a separate magnitude and phase for each of the four transmit/receive pairs (and for each subcarrier in a system implementing orthogonal frequency-division multiplexing (OFDM)).

In one embodiment of the invention, the sounding samples (203C, 203D) correspond to information derived from the CSI (202A, 202B). More specifically, the sounding samples are used to track the changes in magnitude ($\Delta\theta$) and changes in phase ($\theta r$) between sets of samples. Additional detail about the content of the sounding samples is described below with respect to FIG. 2B.

In one embodiment of the invention, the packet loss record (205) tracks consecutive packet loss and whether a sounding operation was performed prior to each of the aforementioned packet losses. The packet loss record (205) may be used to determine whether a given client device is highly mobile. The client device may be deemed to exhibit high mobility if there are three consecutive packet losses and there was a sounding operation performed for the client device prior to each of the three aforementioned packet losses. Those skilled in the art will appreciate that the invention is not limited to using three consecutive packet losses and that other criteria may be used to determine whether a client device is deemed to exhibit high mobility without departing from the invention.

When a client device is deemed to be highly mobile, the AP may set the flag (207). In certain scenarios, when a flag is set for a client device, the CSI and sound samples associated with the client device may be removed from the AP. Further, in one embodiment of the invention, if the AP is scheduled to send a packet(s) to a client device and the AP determines that the client device is associated with a set flag, then the AP transmits packets to the client device via a multiple-input single-output (MISO) transmission instead of as a multi-user-multiple-input multiple-output (MIMO) transmission (see e.g., FIG. 3, step 308). In certain embodiments of the invention, the client device, after its flag is set, may determine that it is no longer highly mobile. In such scenarios, the client device may issue a standard uplink transmission packet to the AP. Upon receipt of the standard uplink transmission packet, the AP may clear the flag for the client device. Once the flag is cleared, sounding for the client device may be performed in accordance with FIG. 4.

Referring to FIG. 2B, each sounding sample (203) may include a client device ID (204), a timestamp (206), a set of absolute magnitude differences ($\delta r$) (208), and a set of absolute phase differences ($\delta \theta$) (210). Each of these components is described below.

In one embodiment of the invention, the client device ID (204) identifies the client device with which the sounding sample is associated. In one embodiment of the invention, the timestamp (206) corresponds to the time of the most recent magnitude or phase used to generate the sounding sample.

In one embodiment of the invention, the set of absolute magnitude differences ($\delta r$) (208) correspond to magnitude differences calculated between the most recent sample (i) and all prior samples (j) for the particular transmit/receive antenna pair for a particular client device (see e.g., Table 2). In one embodiment of the invention, the set of absolute phase differences ($\delta \theta$) (210) correspond to phase differences calculated between the most recent sample (i) and all prior samples (j) for the particular transmit/receive antenna pair for a particular client device (see e.g., Table 2).

The following is an example of how the sounding samples for a given client device may be generated using the CSI for the client device. The example is not intended to limit the invention. Turning to the example, consider a scenario in which the AP includes two antennas (A, B) and the client device includes one antenna (C). Further, assume that the following information is in the CSI (obtained via sounding operations) between the AP and the client device.

TABLE 1

Channel State Information

| Time | Transmit/Receive Antenna Pair | Magnitude | Phase |
|---|---|---|---|
| T1 | A, C | $r_1$ | $\theta_1$ |
| T1 | B, C | $r_2$ | $\theta_2$ |
| T2 | A, C | $r_3$ | $\theta_3$ |
| T2 | B, C | $r_4$ | $\theta_4$ |
| T3 | A, C | $r_5$ | $\theta_5$ |
| T3 | B, C | $r_6$ | $\theta_6$ |

Continuing with the example, using the CSI in Table 1, the following sounding samples may be generated. For purposes of clarity, the client ID of the client device is not included within Table 2.

TABLE 2

Sounding Samples

| Time | Transmit/Receive Antenna Pair | Age | Magnitude Difference ($\delta r$) | Phase Difference ($\delta \theta$) |
|---|---|---|---|---|
| T2 | A, C | (T2 − T1) | $|r_3 - r_1|$ | $|\theta_3 - \theta_1|$ |
|    | B, C | (T2 − T1) | $|r_4 - r_2|$ | $|\theta_4 - \theta_2|$ |
| T3 | A, C | (T3 − T1) | $|r_5 - r_1|$ | $|\theta_5 - \theta_1|$ |
|    | A, C | (T3 − T2) | $|r_5 - r_3|$ | $|\theta_5 - \theta_3|$ |
|    | B, C | (T3 − T1) | $|r_6 - r_2|$ | $|\theta_6 - \theta_2|$ |
|    | B, C | (T3 − T2) | $|r_6 - r_4|$ | $|\theta_6 - \theta_4|$ |

Figure 3:
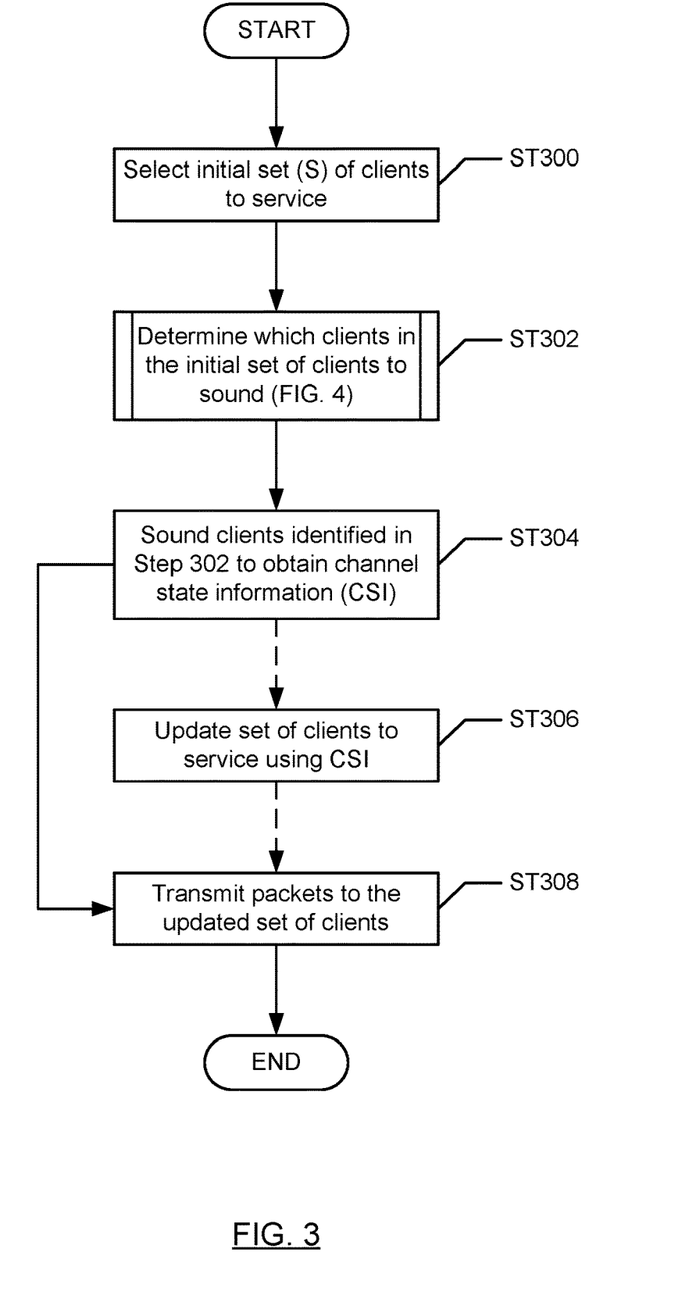
FIG. 3 shows a method for transmitting packets from an access point to a client device in accordance with one or more example embodiments of the invention.
Figure 4:
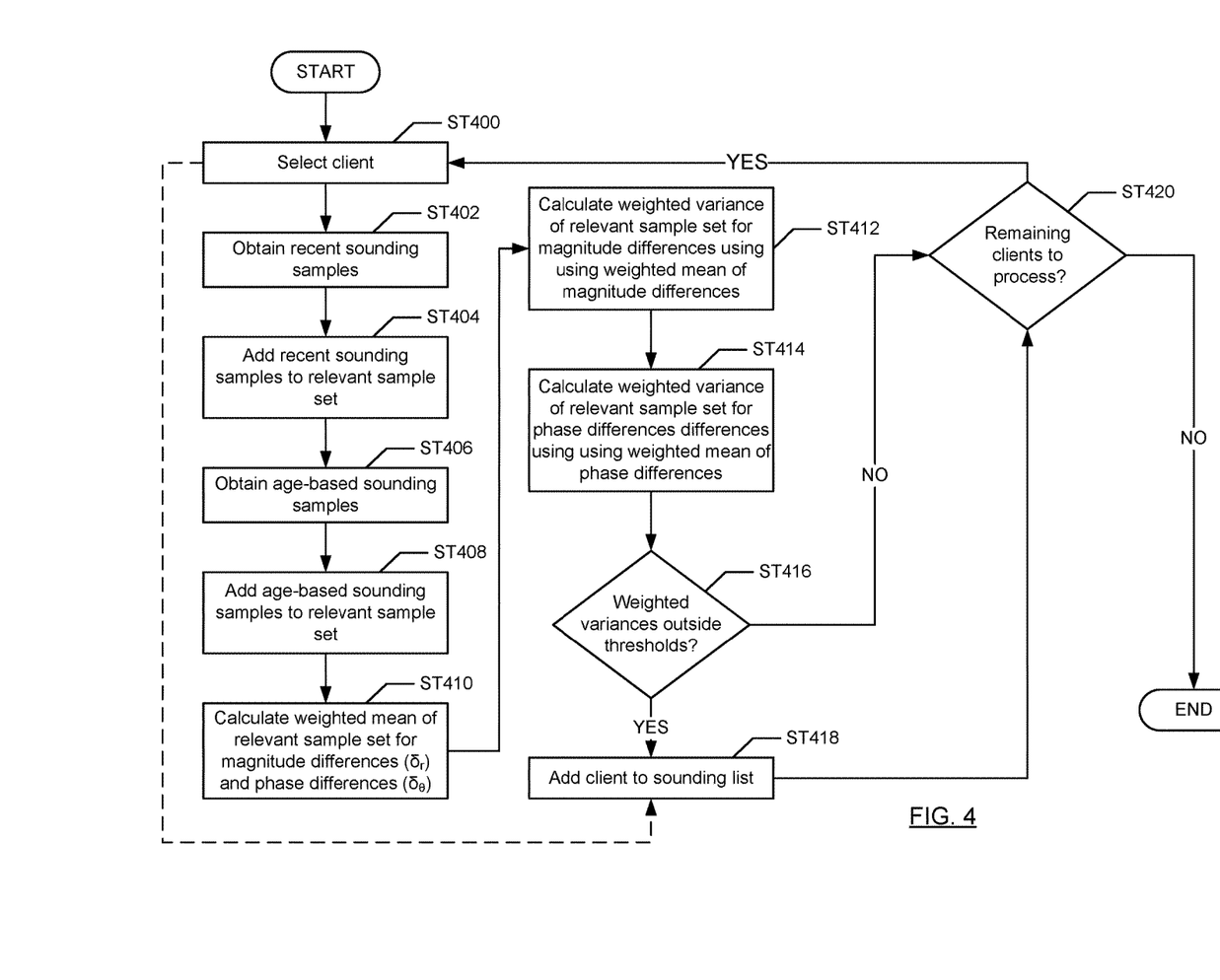
FIG. 4 shows a method for determining whether to "sound" a given client device in accordance with one or more embodiments of the invention.

Turning to the flowcharts in FIGS. 3 and 4, while the various steps in the flowcharts are presented and described sequentially, one of ordinary skill will appreciate that some or all of the steps may be executed in different orders, may be combined or omitted, and some or all of the steps may be executed in parallel.

FIG. 3 shows a method for transmitting packets from an access point to a client device in accordance with one or more example embodiments of the invention.

In step 300, an initial set of client devices (S) to service is selected. The initial set of client devices to service corresponds to client devices to which the AP intends to wirelessly transmit one or more packets. The client devices in the initial set (S) may be selected using any known or later discovered mechanism without departing from the invention. For example, the client devices may be selected in accordance with IEEE 802.11n or IEEE 802.11ac.

In step 302, a determination is made about which client devices in the initial set of client devices to sound. The determination in step 302 is described in FIG. 4. The result of step 302 may be zero or more client devices to sound.

In step 304, the client devices (if any) identified in step 302 are sounded.

Said another way a sounding operation is performed for each of the devices identified in step 302. In one embodiment of the invention, the sounding operation may be the sounding operation specified in IEEE 802.11ac. Other sounding operations that use other sounding protocols may be performed without departing from the invention. For each sounding operation performed in step 304, channel state information (CSI), as described above, is obtained (see e.g., FIG. 2A, Table 1). In one embodiment of the invention, if CSI is obtained, then corresponding sounding samples are generated (see e.g., FIG. 2B, Table 2).

In step 306, the AP may optionally use the CSI obtained in step 304 in order to modify the initial set of client devices selected in step 300. More specifically, because the selection of client devices to service and the sounding of client devices is decoupled, the AP may use the CSI obtained from the sounding in order to select a different set of client devices to service. For example, consider a scenario in which the initial set of client devices is client device 1, client device 2, client device 3, and client device 4. After performing step 302, it is determined that only client device 3 needs to be sounded. Client device 3 is subsequently sounded to obtain CSI for client device 3. The AP may use the CSI obtained for client device 3 as well as historical CSI for client devices 1, 2, and 4 (i.e., CSI that was previously obtained from a prior sounding of the client devices) and determine that there is too much potential interference between client devices 1 and 3. Based on this determination, the AP may replace client device 1 with client device 5 to obtain the following modified set of client devices: client device 2, client device 3, client device 4, and client device 5.

In step 308, packets are transmitted to the initial set of client devices and/or the modified set of client devices. The packets may be transmitted in accordance with IEEE 802.11ac. Alternatively, the packets may be transmitted to the client devices using another wireless protocol. In one embodiment of the invention, transmission of the packets to the client devices involves using the CSI (i.e., CSI obtained in step 304) and/or historical CSI (i.e., previously obtained CSI for client devices for which sounding was not performed in step 304) in order to transmit packets using beamforming.

FIG. 4 shows a method for determining whether to "sound" a given client device in accordance with one or more embodiments of the invention. In one embodiment of the invention, the method shown in FIG. 4 may be used to determine whether a given client device is static (or relatively static) or dynamic (or relatively dynamic). If the client device is determined to be static (or relatively static), then sounding is not performed for the client device; otherwise, sounding is performed on the client device.

Turning to FIG. 4, in step 400, a client device is selected, where the client device is in the initial set of client devices (see FIG. 3, step 300). In one embodiment of the invention, once the client device is selected, the AP may make an initial determination about whether a flag (see e.g., FIG. 2A) is set for the client device. If a flag is set for the client device, then the process proceeds directly to step 418; otherwise, the process proceeds to step 402.

In step 402, recent sounding samples for the selected client device are obtained. More specifically, the AP searches the sounding samples for the client device to determine the set of sounding samples that were generated in the prior x milliseconds. For example, if the current time is denoted as $t_{now}$ then the set of sounding samples that are obtained in step 402 are sounding samples with a time t, where $t-x \leq t \leq t_{now}$. The sound samples obtained in step 402 may correspond to sounding samples for all transmit/receive antenna pairs for the AP and the client device.

The following is an example of how recent sounding samples are obtained in step 402. The example is not intended to limit the scope of the invention. Turning to the example, assume that $t_{now}=T4$, that $t-x \leq T3 \leq t_{now}$ and that the sounding samples currently stored by the AP correspond to the sounding samples shown in Table 2 above. Accordingly, in this example, the following sounding samples may be obtained in step 402.

TABLE 3

Recent Sound Samples

| Time | Transmit/Receive Antenna Pair | Age | Magnitude Difference (δr) | Phase Difference (δθ) |
|---|---|---|---|---|
| T3 | A, C | (T3 − T1) | $|r_5 - r_1|$ | $|\theta_5 - \theta_1|$ |
| T3 | A, C | (T3 − T2) | $|r_5 - r_3|$ | $|\theta_5 - \theta_3|$ |
| T3 | B, C | (T3 − T1) | $|r_6 - r_2|$ | $|\theta_6 - \theta_2|$ |
| T3 | B, C | (T3 − T2) | $|r_6 - r_4|$ | $|\theta_6 - \theta_4|$ |

Continuing with the discussion of FIG. 4, in step 404, the sounding samples identified in step 402 are added to the relevant sample set. In one embodiment of the invention, adding the sound samples to the sample set includes applying a weight (β) to the magnitude differences and phase differences in the identified sounding samples, β is greater than 0.5. Those skilled in the art will appreciate that other values for β may be used without departing from the invention. In one embodiment of the invention, β may be set such that the sounding samples obtained in step 402 are more heavily weighted than sounding samples obtained in step 406.

In step 406, age-based sounding samples for the selected client device are obtained. More specifically, the AP searches the sounding samples for the client device that have the same age (±y) as at least one of the sounding sample identified in step 402. Continuing with the example in Step 402, the identified sounding samples have ages: (T3−T2) and (T3−T1) (see Table 3). Further, assume that (T3−T2)−y≤(T2−T1)≤(T3−T2)+y. Accordingly, the following sounding samples may be obtained in step 406.

TABLE 4

Age-Based Sounding Samples

| Time | Transmit/Receive Antenna Pair | Age | Magnitude Difference (δr) | Phase Difference (δθ) |
|---|---|---|---|---|
| T2 | A, C | (T2 − T1) | $|r_3 - r_1|$ | $|\theta_3 - \theta_1|$ |
| T2 | B, C | (T2 − T1) | $|r_4 - r_2|$ | $|\theta_4 - \theta_2|$ |

Continuing with the discussion of FIG. 4, in step 408, the sounding samples identified in step 406 are added to the relevant sample set. In one embodiment of the invention, adding the sound samples to the sample set includes applying a weight (1-β) to the magnitude differences and phase differences in the identified sounding samples. Those skilled in the art will appreciate that other values for β may be used without departing from the invention.

In step 410, a weighted mean for the magnitude differences and a weighted mean for the phase differences are calculated using the weighted sounding samples in the relevant sample set.

In step 412, a weighted variance for the magnitude differences is calculated using the weighted mean for the magnitude differences calculated in step 410.

In step 414, a weighted variance for the phase differences is calculated using the weighted mean for the phase differences calculated in step 410.

In step 416, a determination is made about whether the weighted variance for the magnitude differences is greater than a magnitude differences variance threshold or whether the weighted variance for the phase differences is greater than a phase differences variance threshold. If either of the weighted variances is greater that its respective threshold, then the process proceeds to step 418; otherwise, the process proceeds to step 420. In one embodiment of the invention, the aforementioned variance thresholds may be determined using, for example, empirical data. Other methods for determining the variance thresholds may be used without departing from the invention.

In step 418, the client device added to the sounding list (i.e., to the list of client devices that will be sounded in step 304).

In step 420, a determination is made about whether there are any additional client devices to analyze. If there are additional client devices to analyze, the process proceeds to step 400; otherwise, the process ends.

Implementation of one or more embodiments of the invention, in relatively static environments, may result in a 73% reduction in sounding overhead without incurring in significant rate losses due to lack of channel estimate accuracy. In addition, Implementation of one or more embodiments of the invention, in a dynamic environment, may result in a 55% reduction in sounding overhead.

Figure 5:
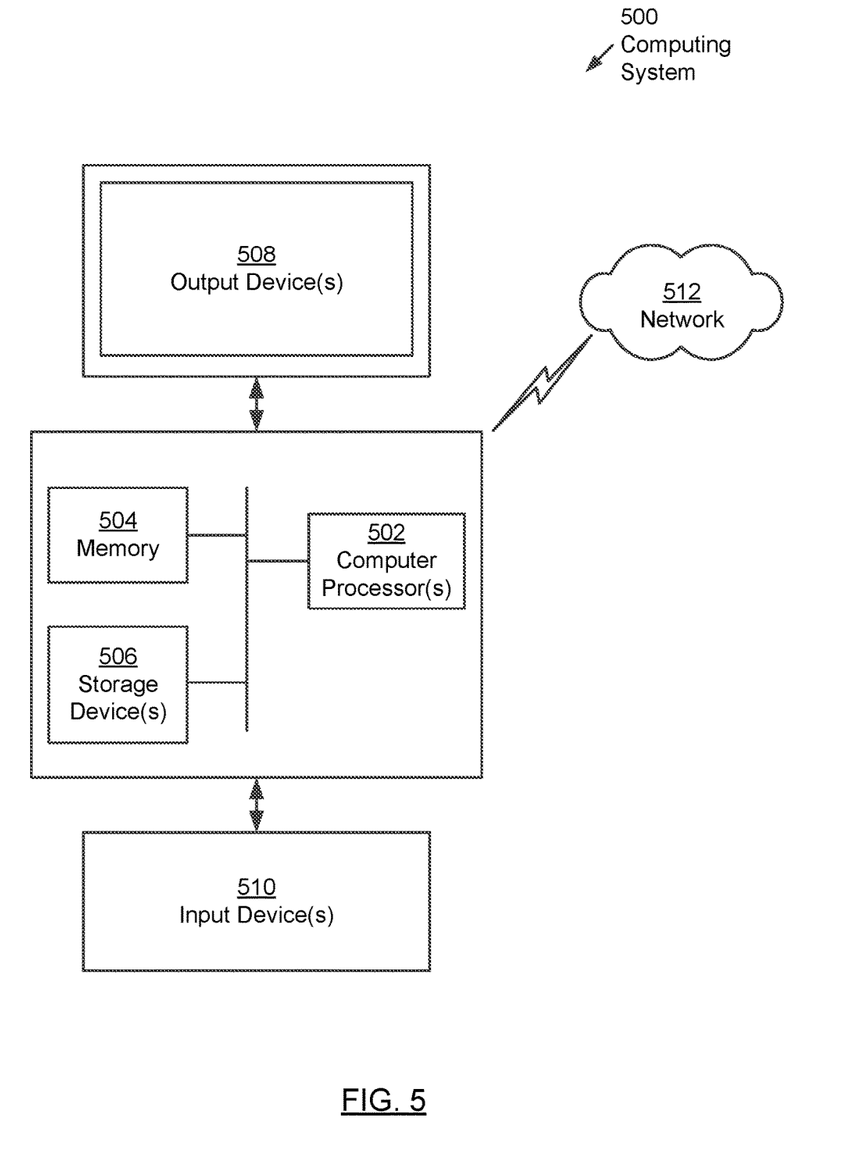
FIG. 5 shows a computing system in accordance with one or more embodiments of the invention.

Embodiments of the invention may be implemented on a computing system. Any combination of mobile, desktop, server, embedded, or other types of hardware may be used. For example, as shown in FIG. 5, the computing system (500) may include one or more computer processor(s) (502), associated memory (504) (e.g., random access memory (RAM), cache memory, flash memory, etc.), one or more storage device(s) (505) (e.g., a hard disk, an optical drive such as a compact disk (CD) drive or digital versatile disk (DVD) drive, a flash memory stick, etc.), and numerous other elements and functionalities. The computer processor(s) (502) may be an integrated circuit for processing instructions. For example, the computer processor(s) may be one or more cores, or micro-cores of a processor. The computing system (500) may also include one or more input device(s) (510), such as a touchscreen, keyboard, mouse, microphone, touchpad, electronic pen, or any other type of input device. Further, the computing system (500) may include one or more output device(s) (508), such as a screen (e.g., a liquid crystal display (LCD), a plasma display, touchscreen, cathode ray tube (CRT) monitor, projector, or other display device), a printer, external storage, or any other output device. One or more of the output device(s) may be the same or different from the input device(s). The computing system (500) may be connected to a network (512) (e.g., a local area network (LAN), a wide area network (WAN) such as the Internet, mobile network, or any other type of network) via a network interface connection (not shown). The input and output device(s) may be locally or remotely (e.g., via the network (512)) connected to the computer processor(s) (502), memory (504), and storage device(s) (505). Many different types of computing systems exist, and the aforementioned input and output device(s) may take other forms.

Software instructions in the form of computer readable program code to perform embodiments of the invention may be stored, in whole or in part, temporarily or permanently, on a non-transitory computer readable medium such as a CD, DVD, storage device, a diskette, a tape, flash memory, physical memory, or any other computer readable storage medium. Specifically, the software instructions may correspond to computer readable program code, that when executed by a processor(s), is configured to perform embodiments of the invention.

Further, one or more elements of the aforementioned computing system (500) may be located at a remote location and connected to the other elements over a network (512). Further, embodiments of the invention may be implemented on a distributed system having a plurality of nodes, where each portion of the invention may be located on a different node within the distributed system. In one embodiment of the invention, the node corresponds to a distinct computing device. Alternatively, the node may correspond to a computer processor with associated physical memory. The node may alternatively correspond to a computer processor or micro-core of a computer processor with shared memory and/or resources.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method for transmitting packets, comprising:
   selecting an initial set of client devices comprising a first client device and a second client device;
   making a first determination, using a first relevant sample set for the first client device, that the first client device does not need to be sounded;
   making a second determination, using a second relevant sample set for the second client device, that the second client device needs to be sounded;
   based on the first and second determination, performing a sounding operation for the second client device to obtain channel state information for the second client device;
   after performing the sounding operation for the second client device:
      wirelessly transmitting at least one packet to the first client device using historical channel state information for the first client device; and
      wirelessly transmitting at least one packet to the second client device using the channel state information,
   wherein making the first determination, using the first relevant sample set for the first client device, that the first client device does not need to be sounded, comprises:
      determining a mean value, wherein the mean value is one selected from a group consisting of a mean phase difference and a mean magnitude difference;
      determining a variance value, wherein the variance value is one selected from a group consisting of a magnitude difference variance and a phase difference variance; and
      determining that the variance value is below a threshold value.

2. The method of claim 1, further comprising:
   modifying, using at least the channel state information, the initial set of client devices to obtain a modified set of client devices, wherein the modified set of client devices comprises the first client device, the second client device, and a third client device, wherein the third client device was not a member of the initial set of client devices; and
   wirelessly transmitting at least one packet to a third client device.

3. The method of claim 1, further comprising:
   making a third determining that a third client device has experienced packet loss for a set of consecutive packets;
   making a fourth determination that a sounding operation was performed for third client device prior to sending each packet in the set of consecutive packets;
   based on the third determination and the fourth determination, setting a flag for the third client device; and
   after setting the flag, wirelessly transmitting a packet to the third client device using a multiple-input single-output (MISO) transmission.

4. The method of claim 3, further comprising:
   after setting the flag:
      receiving a standard uplink transmission packet from the third client device;
      removing the flag from the third client device;
      after removing the flag:
         selecting a second initial set of client devices comprising the third client device;
         making a fifth determination, using a third relevant sample set for the third client device, that the third client device does not need to be sounded; and based on the fifth determination, wirelessly transmitting at least one packet to the third client device using historical channel state information associated with the third client device.

5. The method of claim 1,
wherein the initial set of client devices further comprises a third client device,
the method further comprising:
making a third determination that a packet sent to the third client device was lost,
based on the third determination, performing a sounding operation for the third client device to obtain second channel state information for the third client device; and
wirelessly transmitting at least one packet to the third client device using the second channel state information.

6. The method of claim 1, wherein performing the sound operation for the second client device comprises performing the sounding operation specified in IEEE 802.11ac.

7. The method of claim 1, wherein the first client device is a mobile device.

8. The method of claim 1, wherein the first relevant sample set comprises at least one age-based sounding sample and at least one recent sounding sample.

9. The method of claim 1, wherein the relevant sample set comprises a sounding sample, wherein the sounding sample specifies at least one selected from a group consisting of a magnitude difference and a phase difference.

10. The method of claim 1, wherein the mean value is a weighted mean value and wherein the variance value is a weighted variance value.

11. An access point comprising:
a processor;
a plurality of antennas;
wherein the access point is programmed to:
select an initial set of client devices comprising a first client device and a second client device;
make a first determination, using a first relevant sample set for the first client device, that the first client device does not need to be sounded;
make a second determination, using a second relevant sample set for the second client device, that the second client device needs to be sounded;
based on the first and second determination, perform a sounding operation for the second client device to obtain channel state information for the second client device;
after performing the sounding operation for the second client device:
wirelessly transmit at least one packet to the first client device using historical channel state information for the first client device; and
wirelessly transmit at least one packet to the second client device using the channel state information, and
wherein making the first determination, using the first relevant sample set for the first client device, that the first client device does not need to be sounded, comprises:
determining a mean value, wherein the mean value is one selected from a group consisting of a mean phase difference and a mean magnitude difference;
determining a variance value, wherein the variance value is one selected from a group consisting of a magnitude difference variance and a phase difference variance; and
determining that the variance value is below a threshold value.

12. The access point of claim 11, wherein performing the sound operation for the second client device comprises performing the sounding operation specified in IEEE 802.11ac.

13. The access point of claim 11, wherein the first client device is a mobile device.

14. The access point of claim 11, wherein the first relevant sample set comprises at least one age-based sounding sample and at least one recent sounding sample.

15. The access point of claim 11, wherein the relevant sample set comprises a sounding sample, wherein the sounding sample specifies at least one selected from a group consisting of a magnitude difference and a phase difference.

16. The access point of claim 11, wherein the mean value is a weighted mean value and wherein the variance value is a weighted variance value.

17. A non-transitory computer readable medium comprising computer readable program code which, when executed by a computer processor, enables the computer processor to:
select an initial set of client devices comprising a first client device and a second client device;
make a first determination, using a first relevant sample set for the first client device, that the first client device does not need to be sounded;
make a second determination, using a second relevant sample set for the second client device, that the second client device needs to be sounded;
based on the first and second determination, perform a sounding operation for the second client device to obtain channel state information for the second client device;
after performing the sounding operation for the second client device:
wirelessly transmit at least one packet to the first client device using historical channel state information for the first client device; and
wirelessly transmit at least one packet to the second client device using the channel state information,
wherein making the first determination, using the first relevant sample set for the first client device, that the first client device does not need to be sounded, comprises:
determining a mean value, wherein the mean value is one selected from a group consisting of a mean phase difference and a mean magnitude difference;
determining a variance value, wherein the variance value is one selected from a group consisting of a magnitude difference variance and a phase difference variance; and
determining that the variance value is below a threshold value.

18. The non-transitory computer readable medium of claim 17, further comprising computer readable program code which, when executed by the computer processor, enables the computer processor to:
modify, using at least the channel state information, the initial set of client devices to obtain a modified set of client devices, wherein the modified set of client devices comprises the first client device, the second client device, and a third client device, wherein the third client device was not a member of the initial set of client devices; and wirelessly transmit at least one packet to a third client device.

\* \* \* \* \*